United States Patent
Tarandach (12) 
(10) Patent No.: US 10,211,992 B1
(45) Date of Patent: Feb. 19, 2019

(54) SECURE CERTIFICATE PINNING IN USER PROVISIONED NETWORKS

(71) Applicant: EMC IP Holding Company LLC, Hopkinton, MA (US)

(72) Inventor: Izar Tarandach, Eugene, OR (US)

(73) Assignee: EMC IP Holding Company LLC, Hopkinton, MA (US)

( * ) Notice: Subject to any disclaimer, the term of this patent is extended or adjusted under 35 U.S.C. 154(b) by 346 days.

(21) Appl. No.: 15/075,038

(22) Filed: Mar. 18, 2016

(51) Int. Cl.
*H04L 29/06* (2006.01)
*H04L 9/32* (2006.01)
*H04L 9/06* (2006.01)

(52) U.S. Cl.
CPC .......... *H04L 9/3273* (2013.01); *H04L 9/0643* (2013.01); *H04L 9/3236* (2013.01); *H04L 9/3268* (2013.01); *H04L 63/0428* (2013.01); *H04L 63/18* (2013.01); *H04L 63/1466* (2013.01)

(58) Field of Classification Search
None
See application file for complete search history.

(56) References Cited

U.S. PATENT DOCUMENTS

| | | | | |
|---|---|---|---|---|
| 9,143,504 B1 * | 9/2015 | Shi | | H04L 63/0823 |
| 2002/0073310 A1 * | 6/2002 | Benantar | | H04L 9/3268 |
| | | | | 713/156 |
| 2008/0098214 A1 * | 4/2008 | Rodriguez Martinez | | |
| | | | | H04L 9/3268 |
| | | | | 713/156 |
| 2008/0301438 A1 * | 12/2008 | Parkinson | | H04L 9/3218 |
| | | | | 713/156 |
| 2009/0060187 A1 * | 3/2009 | Doyle | | H04L 9/3268 |
| | | | | 380/259 |
| 2009/0103725 A1 * | 4/2009 | Tang | | G06Q 20/20 |
| | | | | 380/45 |
| 2014/0244429 A1 * | 8/2014 | Clayton | | G06Q 30/0631 |
| | | | | 705/26.7 |
| 2016/0269393 A1 * | 9/2016 | Corella | | H04L 63/083 |
| 2016/0314286 A1 * | 10/2016 | Dusad | | G06F 21/121 |
| 2017/0134350 A1 * | 5/2017 | Kravitz | | H04L 63/061 |
| 2017/0300670 A1 * | 10/2017 | Horne | | G06F 21/16 |
| 2018/0026797 A1 * | 1/2018 | Behm | | H04L 9/3263 |

* cited by examiner

*Primary Examiner* — Michael R Vaughan
(74) *Attorney, Agent, or Firm* — Staniford Tomita LLP (57) ABSTRACT

Embodiments are directed to a system and method of exchanging certificate pinning information between a server and client over an unprotected network by: obtaining a server certificate fingerprint to validate the server to the client during network communication; upon receipt of a request from the client, wrapping the server certificate fingerprint in an envelope that is encrypted using a hash of a password defined by the user and transmitted for storage on the server; and transmitting the envelope as part of a payload over the network to the client to enable the client to decrypt the envelope using the password and obtain the server certificate fingerprint for pinning to data elements transmitted to the server.

14 Claims, 7 Drawing Sheets

SECURE CERTIFICATE PINNING IN USER PROVISIONED NETWORKS

TECHNICAL FIELD

Embodiments are generally directed to network security, and more specifically to a method of securely agreeing on certificate pinning pins in a dynamic and user provisioned system.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Certificate Pinning is a method of authenticating servers to clients based on prior knowledge of the identity of the server and provisioning ('hardcoding') its details into the client through a data item known as a 'pin.' Pinning is the process of associating a host with their expected X509 certificate or public key in order to counteract or block man-in-the-middle (MITM) attacks where an intermediary server intercepts and hijacks network sessions between a client and server using a false certificate. Using certificate pinning, once a certificate or public key is known or seen for a host, the certificate or public key is associated or 'pinned' to the host. This process leverages knowledge of the pre-existing relationship between the user and an organization or service. Certificate pinning thus lets a client know more about the certificate it will be expecting to receive from the server than the information exchanged during the connection handshake.

Present certificate pinning methods use information that is already known on the server or service, and therefore do not need to rely on generalized mechanisms meant to solve the key distribution problem. When the server is known beforehand, it is somewhat trivial to hardcode its fingerprint into clients that expect to connect to it, like browsers and mail clients. A user is given a reasonable expectation that if the connection is completed, then it is happening with the desired server and not an impersonator. Thus, if the server hostname is known beforehand and relatively constant, or if it is a well-known public location, then the certificate can be added when the client is developed and become a hardcoded part of it. Adding the certificate at development time is preferred since preloading the certificate or public key out of band usually means the attacker cannot taint the pin. If the certificate or public key is added upon first encounter, the system requires key continuity, which can fail if the attacker has a privileged position during the first connection. In most cases, as when a vendor develops a client/server system that will be deployed at a customer, this preloading is not possible simply because the developer has no knowledge of the certificate infra-structure at every possible customer. There needs to be a way to deliver the pin out-of-band, securely and in a trusted manner after deployment of the servers. Key continuity is not a solution, since it implies the first connection is somehow assumed trusted. In many networks, especially in the mobile environment, a packet can go through a number of uncontrolled networks, and this assumption of a secure first-connection is a weak one.

Present certificate pinning systems and methods are thus not absolutely effective in deployment environments where servers are sold to customers who provision them in their own networks. What is needed, therefore, is a method of providing a secure, trustable method of sharing the certificate pinning information after deployment, and to solve the dynamic key distribution problem in certificate pinning systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

For purposes of the present description, the terms "certificate," "certificate pin," "pin," "key," or "certificate key" may all refer to a data element commonly referred to as a certificate pinning pin that is associated with SSL (Secure Sockets Layer) encoding and hardcoded into a client computer to check against a server's certificate to guard against impersonation or MITM attacks.

Figure 1:
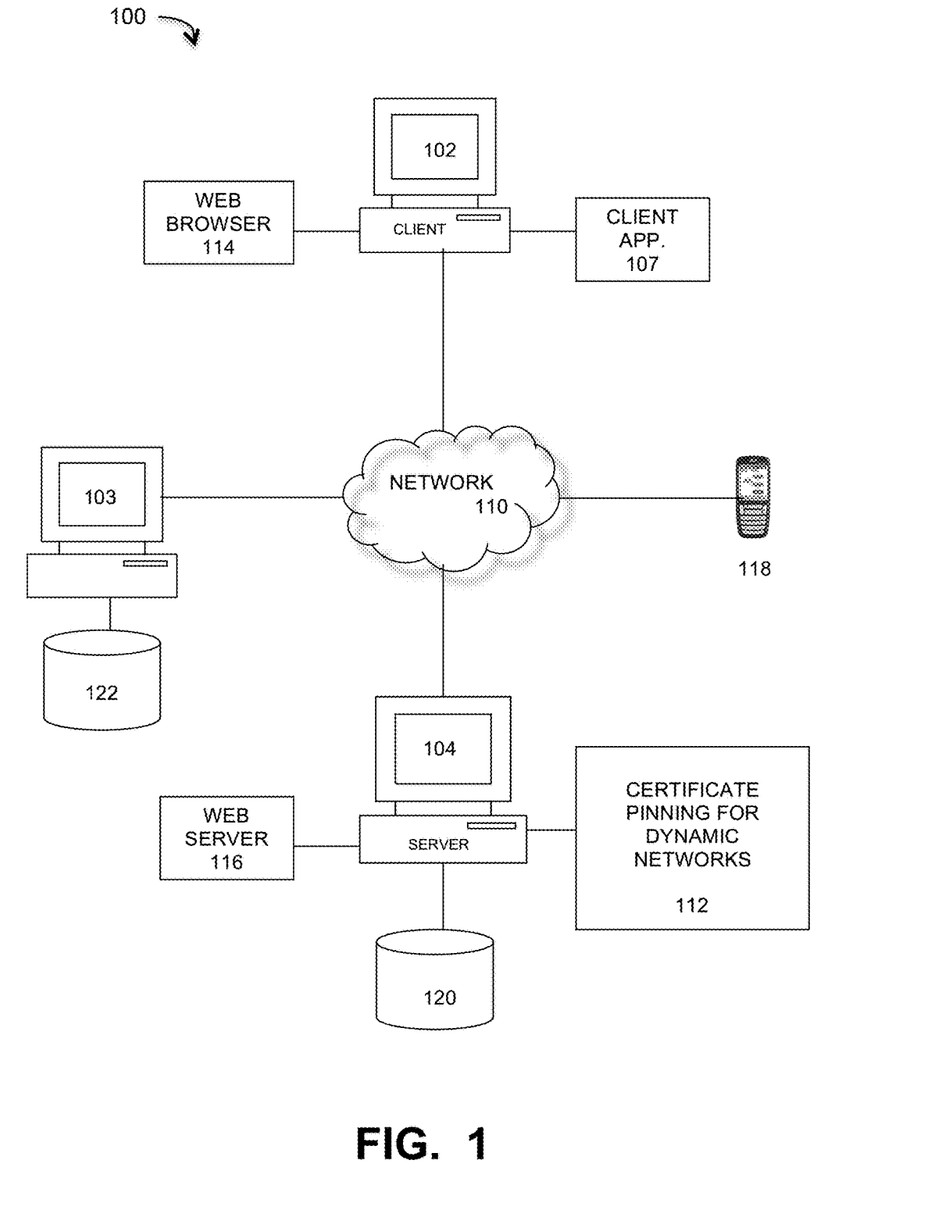
FIG. 1 illustrates a computer network system that implements one or more embodiments of a certificate pinning method for client-server networks, under some embodiments.

Embodiments are directed to methods of delivering certificate pins securely in trusted or untrusted HTTPS (secure HTTP) networks. Aspects of the one or more embodiments described herein may be implemented on one or more computers executing software instructions. The computers may be networked in a client-server arrangement or similar distributed computer network. FIG. 1 illustrates a computer network system 100 that implements one or more embodiments. In system 100, a network server computer 104 is coupled, directly or indirectly, to one or more network client computers 102 through a network 110. The network interface between server computer 104 and client computer 102 may include one or more routers that serve to buffer and route the data transmitted between the server and client computers. Network 110 may be the Internet, a Wide Area Network (WAN), a Local Area Network (LAN), or any combination thereof.

In one embodiment, the server computer 104 is a World-Wide Web (WWW) server that stores data in the form of web pages and transmits these pages as Hypertext Markup Language (HTML) files over the Internet 110 to the client computer 102. For this embodiment, the client computer 102 typically runs a web browser program 114 to access the web pages served by server computer 104 and any available content provider or supplemental server 103.

In one embodiment, server 104 in network system 100 is a server that executes a certificate pinning process 112 to enable secure communication over the HTTP network 110. The processes may represent one or more executable programs modules that are stored within network server 104 and executed locally within the server. Alternatively, however, it may be stored on a remote storage or processing device coupled to server 104 or network 110 and accessed by server 104 to be locally executed. In a further alternative embodiment, the certificate pinning process 112 may be implemented in a plurality of different program modules, each of which may be executed by two or more distributed server computers coupled to each other, or to network 110 separately.

For an embodiment in which network 110 is the Internet, network server 104 executes a web server process 116 to provide HTML documents, typically in the form of web pages, to client computers coupled to the network. To access the HTML files provided by server 104, client computer 102 executes a web browser process 114 that accesses web pages available on server 104 and other Internet server sites, such as content provider 103 (which may also be a network server executing a web server process). The client computer 102 may be a workstation computer or it may be a computing device such as a notebook computer, personal digital assistant, or the like. The client computer may also be embodied within a mobile communication device 118, game console, media playback unit, or similar computing device that provides access to the Internet network 110 and a sufficient degree of user input and processing capability to execute or access the applications or data sources. The client computers 102 and 118 may be coupled to the server computer 104 over a wired connection, a wireless connection or any combination thereof.

Figure 2:
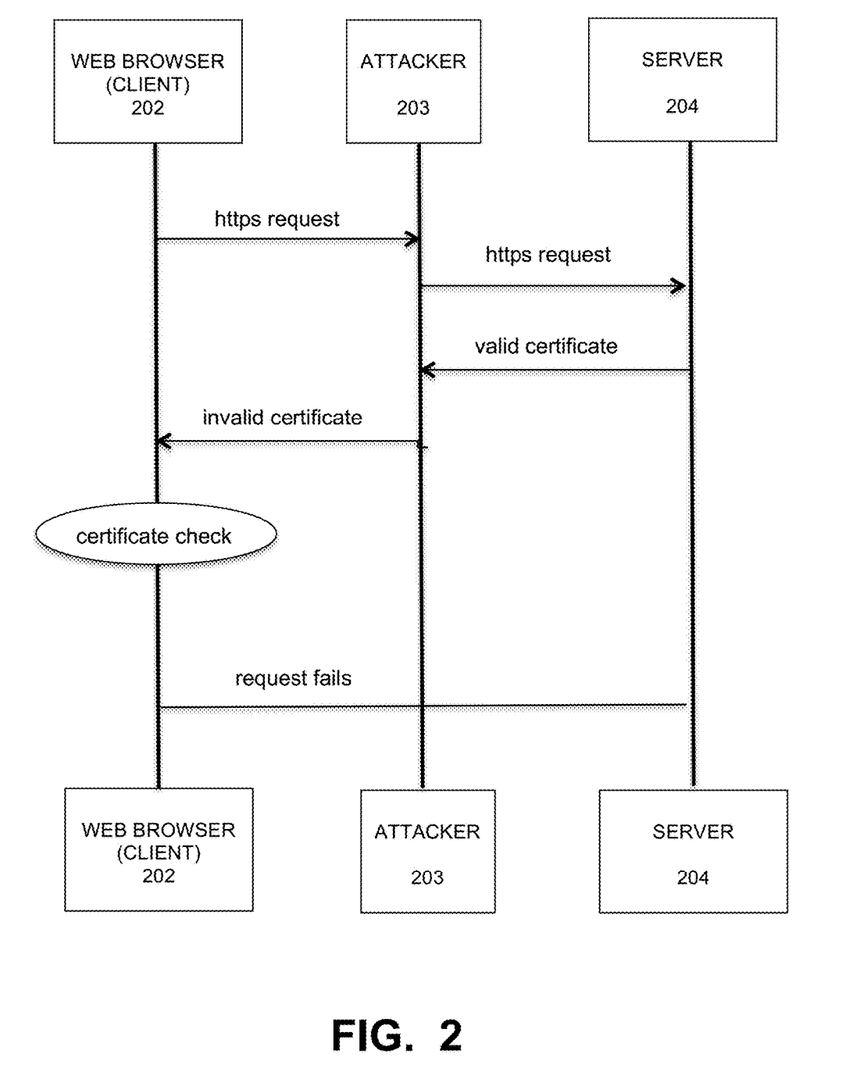
FIG. 2 illustrates the operation of the certificate validation process in an MITM attack, under some embodiments.

In an embodiment, the certificate pinning process 112 utilizes a certificate agent that validates certificate keys (pins) provided by the server 104 to the client 102 to guard against attacks such as an MITM attack. FIG. 2 illustrates the operation of the certificate validation process in an MITM attack, under some embodiments. As shown in FIG. 2, a client computer user issues a https (secure HTTP) request to a target web server 204. The request is intercepted by an intermediate server operated by an attacker 203, which forwards the request to the server 204. The server responds with its certificate. The attacker then intercedes and sends its own certificate to the browser client. In a certificate pinning system, the browser is hardcoded with the expected (valid) certificate at production or installation time. The certificate check process compares the received (invalid) certificate with the pinned certificate and determines that there is no match, the client stops talking to the server 204 and the request fails.

For the embodiment of FIG. 2, the certificate checking process uses a certificate that is pinned. The certificate pinning process 112 may use a preloaded certificate distributed out-of-band, or a certificate that is distributed in-band using key continuity measures. In environments where the client server system is deployed by the user or otherwise developed without control over the configurations affecting the certificates, such measures are not adequate. In an embodiment, the certificate pinning process is augmented to use a pre-existing relationship to enable secure agreement on the pinned certificate in such dynamic or user-provisioned systems.

As stated above, the certificate pinning process 112 uses a trust relationship between the server and client. Using a previous relationship with the server effectively pre-empting the first connection to establish key continuity, but this is not always a given, particularly when dealing with non-technical users that will not be able to decide if the presented credentials establish a trusted relationship between client and server. In order to overcome the no-relationship problem, the process builds upon the trust that already exists between the user and the server to add trust between the client and the server.

In a first case, the process assumes a setup where user A has already established a trusted relationship with server S over a channel with low probability of eavesdropping: this trusted relationship is demonstrated by the server storing a hashed form of a password supplied by user, which the user uses every time it needs to authenticate itself to the server (i.e., the user's password in hashed form). This is a relatively trivial operation exemplified by the provisioning of a new user in a corporation and establishing of an initial password over a local, trusted network. In such a case, a typical procedure would be for a system administrator to install and set up a client computer or terminal for a user in the company. The user then chooses and enters his or her own password, which is sent to the server and stored there in hashed form. Thus the server knows password upon creation and entry of the user, and the user knows that only the server knows the password. In general, the server can validate the password in that it does not know the cleartext form of the password but can indicate that the client is giving the same password that it gave before.

The channel used for communication between the user and server is often not trusted. This occurs notably in wireless environments and mobile phone networks, but is also present in the general case of use over the Internet. If the client executable that the user uses to communicate with the server already embeds the fingerprint of a certificate that the server is expected to present, the trust is elevated. However, as stated above, there are cases when the certificate is not known beforehand and the fingerprint cannot be embedded in the binary at build or deployment time at a reasonable cost. In this case, the trusted relationship between the client and server to provide the client binary with a fingerprint that can be safely stored and use to guarantee the identity of the server in future communications.

Figure 3:
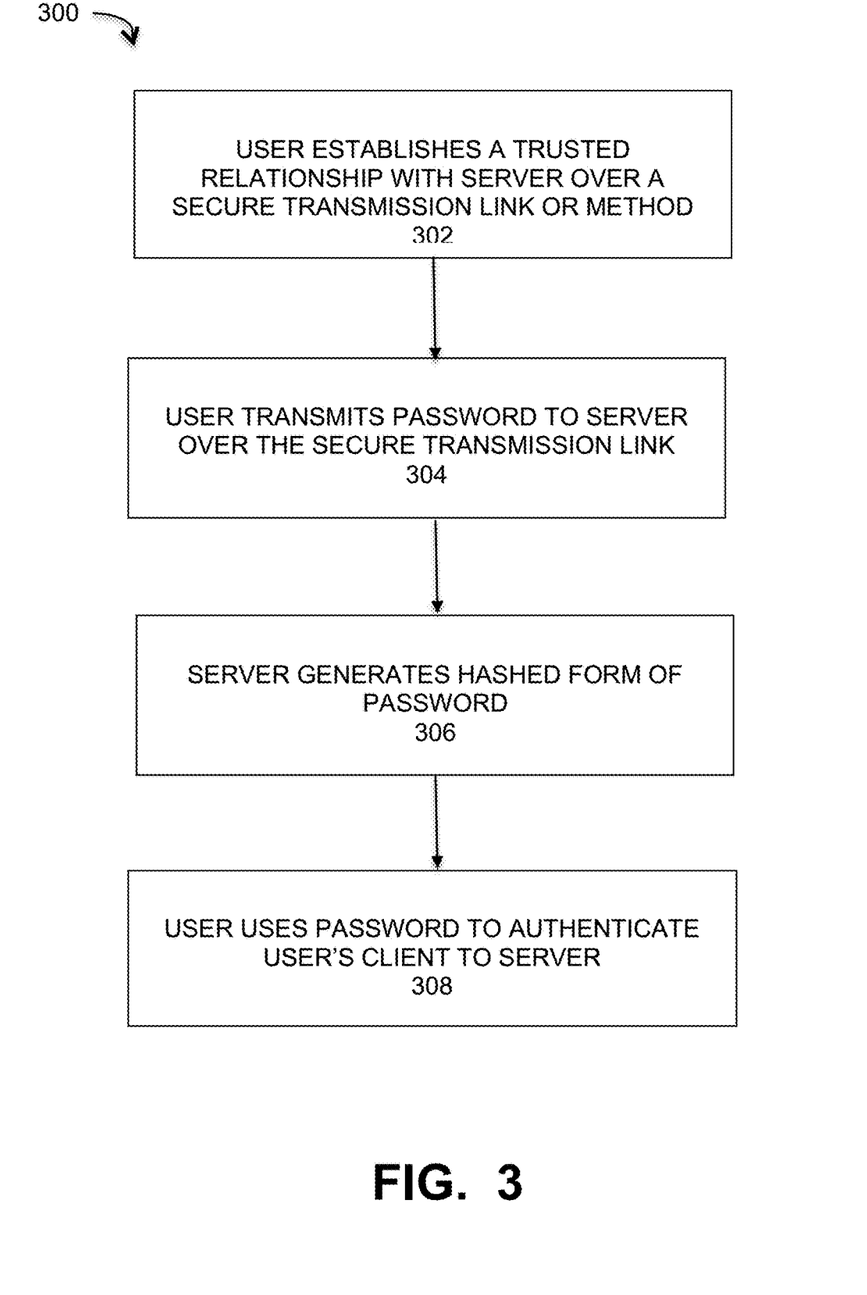
FIG. 3 is a flowchart that illustrates a method of processing and using a password, under some embodiments.

FIG. 3 is a flowchart that illustrates a method of processing and using a password, under some embodiments. The process 300 begins with the user (A) establishing a trusted relationship with the server (S), block 302. This can be done by electronic communication (e.g., e-mail, short message, etc.) over a known secure network link that has a low probability of eavesdropping. Other non-electronic methods may be used as well, such as in-person credential exchange, phone call, fax or mail delivery, and so on. Once the secure exchange link or method has been established, the user sends or informs the server of the password of the user's client computer, block 304. The server generates and stores a hashed form of a password supplied by the user, block 306, which the user uses every time it needs to authenticate to the server, block 308. For this embodiment, in block 306, the server may generate and store a hashed representation of the user password (user_pw_hash) and the salt used (user_pw_salt) for the hash value. The salt is random data that is uniquely generated for the password and used as additional input to the one-way hash function. The use of the salt value helps defend against dictionary attacks and strengthens the hash process. Process 300 illustrates an operation conducted in a controlled environment, such as the provisioning of a new user in a corporation and establishing of an initial password over a trusted network, or through direct exchange.

Figure 4:
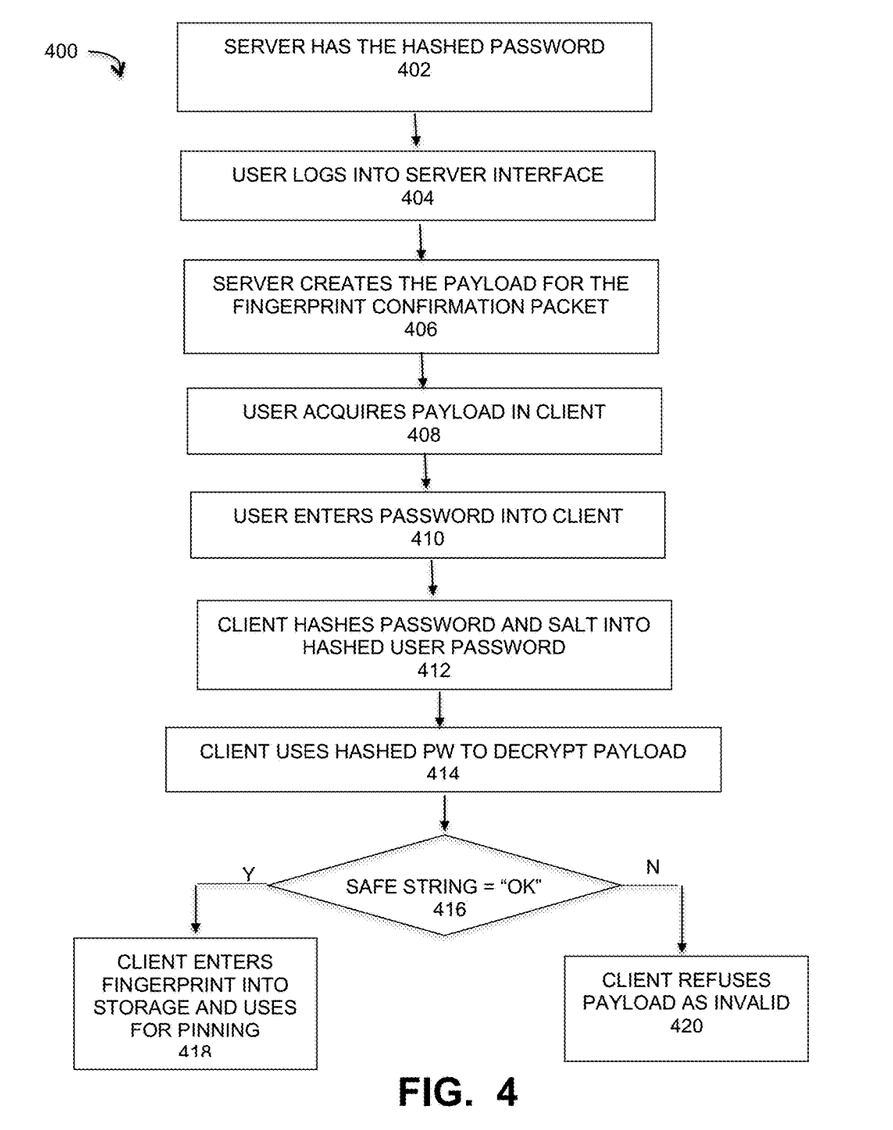
FIG. 4 is a flowchart that illustrates a method of acquiring pinning information for a pinned certificate, under some embodiments.

In contrast to the known, controlled exchange of the password credential of process 300, many initial exchanges are conducted over uncontrolled, insecure, or non-trusted networks. FIG. 4 is a flowchart that illustrates a method of acquiring pinning information for a pinned certificate, under some embodiments. Process 400 continues from process 300 as shown in block 402 with the server having a hashed form of the password as defined in the user creation process (e.g., block 306). This is used for comparison purposes (as part of a normal authentication process) and use later if it matches what is provided by the client later. This exchange of the password from the user to the server is over the non-trusted network. The server stores the hashed representation of the password, user_pw_hash, and the salt used, user_pw_salt, which is made available to itself.

Figure 5:
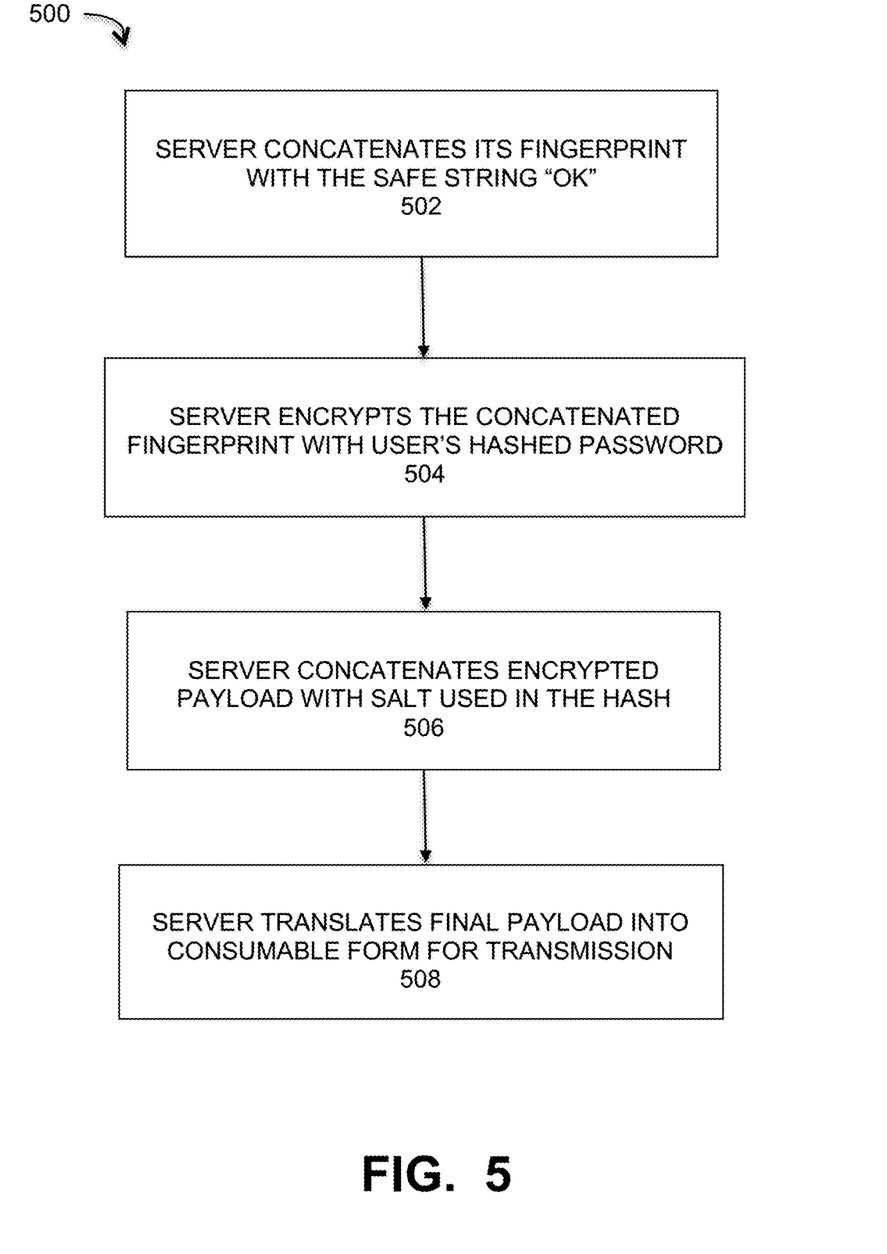
FIG. 5 is a flowchart that illustrates a method of creating a server fingerprint confirmation packet for the process of FIG. 4, under an embodiment.

At any time later, the user logs in into the service provided by the server that is to be authenticated, and requests the server's fingerprint confirmation packet, block 404. The fingerprint confirmation is created by a process as illustrated in FIG. 5. As shown in process 500 of FIG. 5, the server creates the fingerprint confirmation packet by first concatenating its fingerprint (server_cert_fingerprint) with a safe alphanumeric text string, such as the string "OK" to form a concatenated string (server_cert_fingerprint_||OK), block 502. It then encrypts the concatenated string with the client's hashed password as a key, block 504. This forms an encrypted payload, such as: enc(server_cert_fingerprint_||OK, user_pw_hash). The server then concatenates the encrypted payload with the salt used to hash the user password (user_pw) into the hashed user password (user_pw_hash), block 506. This results in a final payload, such as: (enc(server_cert_fingerprint||OK,user_pw_hash)||user_pw_salt). The final payload encompassing the server fingerprint confirmation packet is then translated into a consumable form that can be safely transmitted without loss, block 508. The payload may be encoded as: base64, uuencode, a QR (quick response) code or other type of matrix bar code, and the like.

With reference back to FIG. 4, once the server fingerprint confirmation packet is created, block 406, the user acquires the final payload (payload) either by having it transmitted or provided by the server directly to the user, block 408. This can be done by e-mail message, via the QR representation, or by any other suitable form, such as direct presentation by the server's system administrator or technical personnel. In general, an out-of-band transmission is preferable, but any appropriate transmission means is possible. On the client computer, the user enters their password user_pw_password into the client binary user interface, block 410.

The client computer then executes a process that uses the user password (user_pw_password) and the salt (user_pw_salt) from the final payload (payload) to re-create the hashed password (user_pw_hash) locally, block 412. The client then uses the hashed password (user_pw_hash) to decrypt the encrypted concatenated safe string, enc(server_cert_fingerprint||OK), from the final payload, block 414. It then verifies it succeeded by checking the decrypted data for the OK safe string at the correct place, block 416. If the safe string matches and is in the correct place, the client obtains the fingerprint certificate packet from the final payload, and uses it as a pin to effect certificate pinning, block 418. If the safe string does not match, the client refuses the payload as invalid indicating it has possibly been tampered or corrupted, block 420. This exchange process provides a trusted solution for certificate pinning that does not directly rely on an out-of-band transmission of pinning information or embedding information at build time.

In an embodiment, since hashing limits the alphabet available for user_pw_hash, the process adds protection against an adversary, enough to stop a brute-force attack of the hash used as the key for the steps of creating the hash rounds of PBKDF2 with a random salt. This will slow down a brute-force attack against the payload (in any attack akin to pass-the-hash). The password/hash used for the process can also be a "throw-away" one, separated from the users' passwords in the server in order to stop long-term recovery of the password from a captured packet. The method may also be extended to make use of 2FA mechanisms like RSA's SecurID to provide the initial level of trust instead of the user's password. Appropriate modifications to the protocol may be made as needed.

Figure 6:
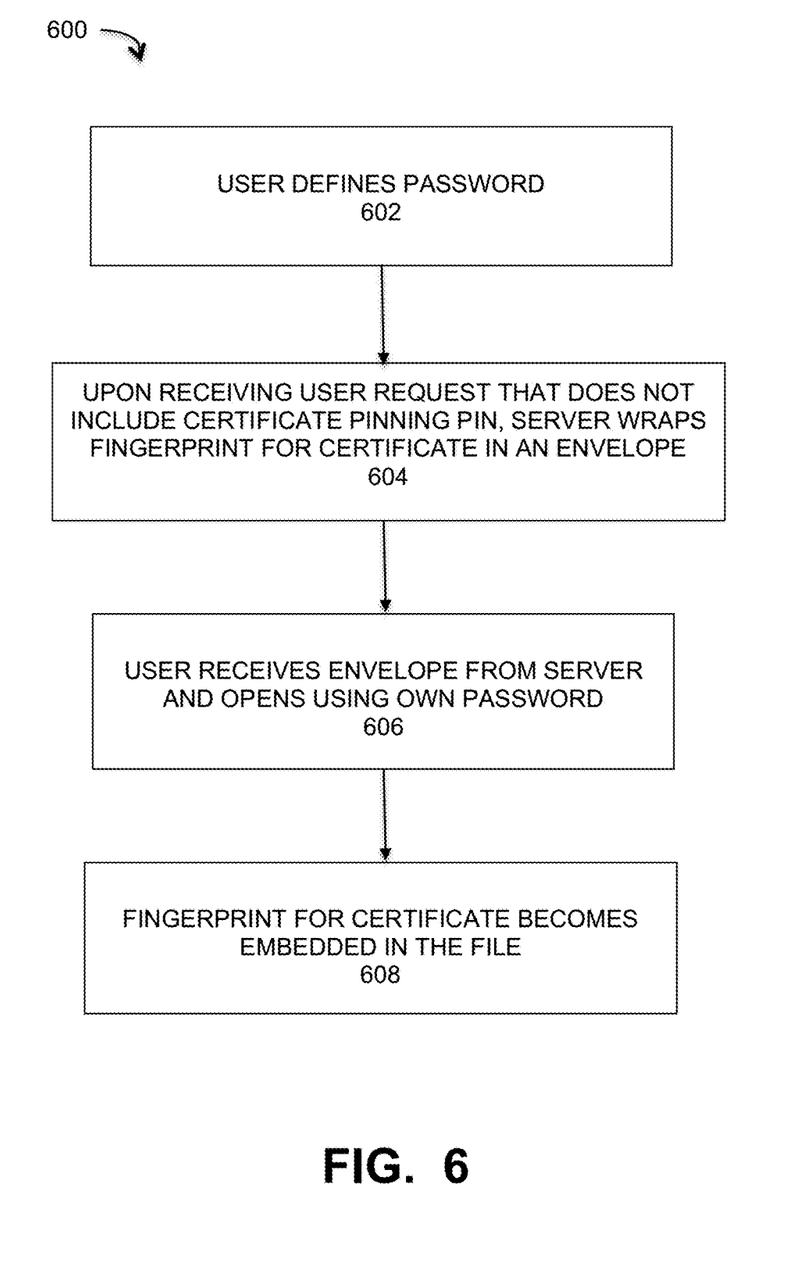
FIG. 6 is a flowchart that illustrates a method of wrapping a certificate pinning pin in an envelope for transmission between a server and client, under some embodiments.

FIG. 6 is a flowchart that illustrates a method of wrapping a certificate pinning pin in an envelope for transmission between a server and client, under some embodiments. As shown in process 600, the process starts with the user defining his or her own password (pw) and storing this locally as well as inputting it into an interface coupled to the server computer, block 602. If the user tries to access the server through a computer or mobile device that does not have a pinned certificate for the server, such as if the user accesses the server through a different client or mobile device, it will send a request to the server that does not include the pinned certificate expected by the user. Upon receiving this access request, the server will recognize that the expected pinned certificate is not present and will send this to the user's present client device through the process illustrated in FIGS. 4 and 5. As shown in the general process steps of FIG. 5, the server will encrypt its fingerprint for the certificate in an envelope using something that is derived from the user's password, block 604, and sends it to the user. The system relies on the fact that the user knows his or her own password regardless of the client computer. The user receives the envelope in the client computer and opens the envelope using the password, block 606. The fingerprint for the certificate is thus accessed by the user and becomes embedded in the file or securely stored on the client so that it becomes part of future requests to the server from the client, block 608. In this manner, the server and client agree upon the certificate pinning pin for the server based on user password information that is known securely by both the user and the server.

The fingerprint for the certificate is wrapped in the envelope using certain hash and encryption processes executed on the original user's password. Hash operations and values are generally used so that server does not have to store the password in cleartext, and general hash plus salt values represent standard processes to encrypt a password on a server for secure storage. The certificate pin is encrypted using a hash of the user password. The system thus uses a hash to generate a key to encrypt fingerprint for the certificate. On the client, the user enters the password to generate the key, and uses it to decrypt the fingerprint, which is then used to pin the certificate that is part of the payload sent from the server to the client.

Figure 7:
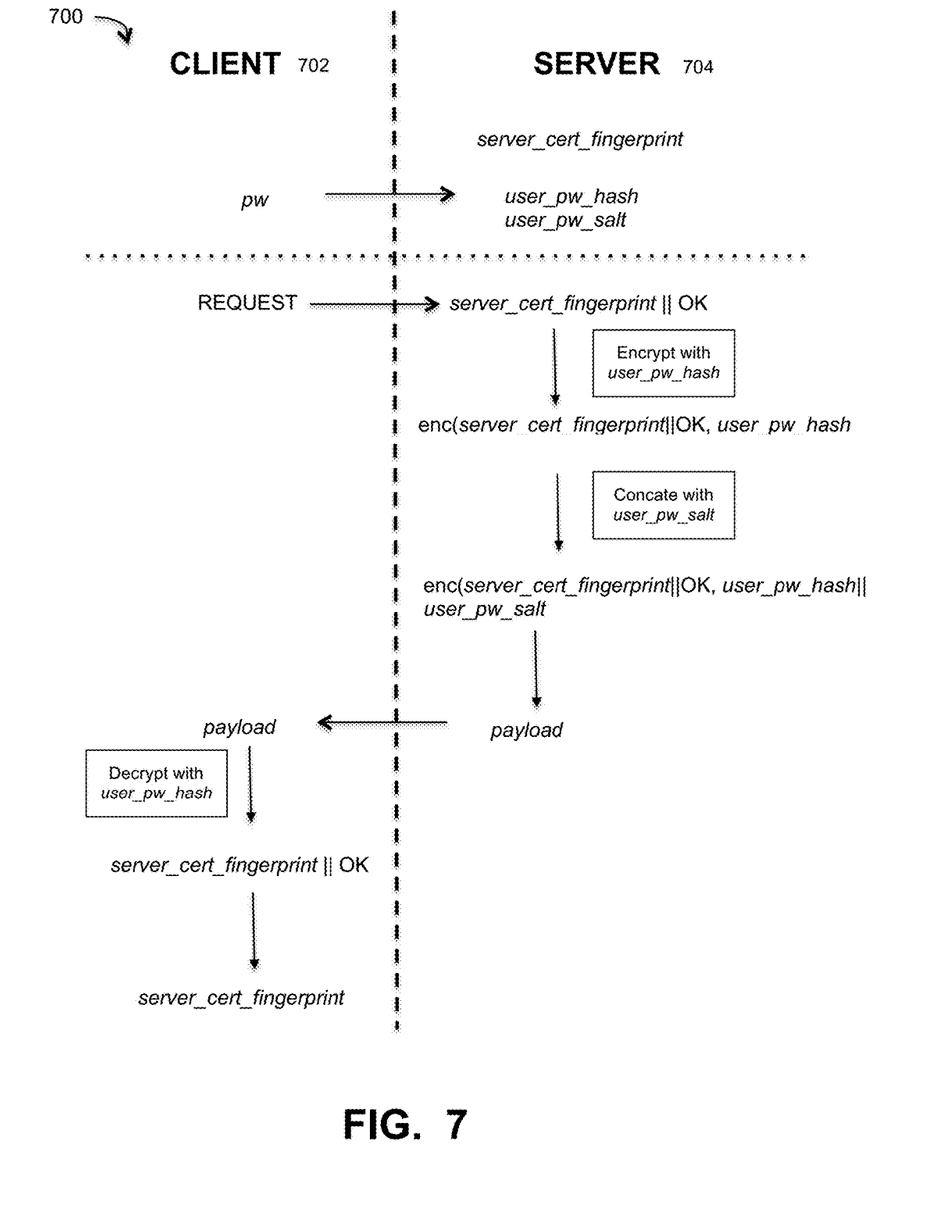
FIG. 7 is a diagram illustrating the processing of server certificate fingerprint data element between server and client processes, under some embodiments.

FIG. 7 is a diagram illustrating the processing of server certificate fingerprint data element between server and client processes, under some embodiments. FIG. 7 illustrates certain data elements defined, stored, and transmitted and processed by respective client 702 and server 704 software processes or hardware components for the data elements described above. As shown in diagram 700, the fundamental data elements of a server certificate fingerprint (server_cert_fingerprint) is defined and stored on the server, and a user password (pw) is defined by the user and stored on the server. In general, the password is stored on the server only; the user knows it and enters it in the client seeking the pinning information, the password is not necessarily stored on the client as well, typically the server only. Under known encryption processes using hash (user_pw_hash) and salt (user_pw_salt) values, the password is stored in the server. Upon an access request from the client at any time later, the server generates the concatenated certificate finger print (server_cert_fingerprint||OK) and encodes it with the hashed user password to generate an encoded certificate fingerprint enc(server_cert_fingerprint||OK, user_pw_hash). This encoded fingerprint is then concatenated with the password salt value enc(server_cert_fingerprint||OK, user_pw_hash||user_pw_salt) to form the payload that is sent from the server to the client. The client decrypts the payload with the password hash to get the concatenated certificate fingerprint (server_cert_fingerprint||OK) from which the original server certificate fingerprint (server_cert_fingerprint) can be obtained for pinning by the client.

Embodiments may be implemented as computer-implemented server-side and client-side software processes executed by one or more microprocessors or processor-based components. They may also be implemented as logic processes implemented through hardware circuits or programmed gate arrays, or any combination thereof.

The program code may be written in a higher level source code, such as C, C++, or any other language. Source code for a sample implementation is provided as below.

Example for a server-side software process that may be implemented in an example embodiment is as follows:

```
#!/usr/bin/env python
import hashlib
import os
import base64
from pbkdf2 import PBKDF2
from Crypto import Random
from Crypto.Cipher import AES
# for demonstration purposes, the user's password is listed.
# in a real implementation, the password, hash and salt are all
# established beforehand and used by the system, including use of "throw-away"
# passwords
user_pw='MyLongDummyPassword'
user_pw_salt=os.urandom(16)
user_pw_hash=hashlib.sha256(user_pw+user_pw_salt).digest( ) #32 byte
pbkdf2_salt=os.urandom(8)
user_pw_hash_pbkdf2=PBKDF2(user_pw_hash, pbkdf2_salt).read(32) # also 32 byte
# this is what we want to pin down. This for example is the public key for the
# certificate at https://XYZCorp.com
```

```
server_cert_fingerprint=
'BBA48WEROIOUN094LKJ43349LKS.DJJI9989-
8793242LKLKJDSAFHHJK345432K
345JH4K,
MN5KJ3LKJ3L234M5NL3K3J45K4L3K4512DD19E2-
A584CB10EBC8E9D5
    C63C7098WJLKJ14BD\
    print server_cert_fingerprint
    print "---"
    # step 3a
    confirmation_packet=server_cert_fingerprint+'OK'
    # pad the input
    raw_crypt=confirmation_packet+(32-len(confirmation_
packet) % 32)*
    chr(32 len(confirmation_packet) % 32)
    # step 3b
    iv=Random.new( ).read(AES.block_size)
    cipher=AES.new(user_pw_hash_pbkdf2,    AES.MOD-
E_CBC, iv)
    ciphertxt=cipher.encrypt(iv+raw_crypt)
    # step 3c
    raw_msg=ciphertxt+"|"+user_pw_salt+"|"+pbkdf2_salt
    # step 3d
    payload=base64.b64encode(raw_msg)
    # step 4
    print payload
    Example for a client-side software process that may be
implemented in an example embodiment is as follows:
    #!/usr/bin/env python
    import hashlib
    import base64
    from Crypto.Cipher import AES
    from pbkdf2 import PBKDF2
    # step 4
    b64ed=raw_input("Payload from server:")
    (ciphertxt,       user_pw_salt,       pbkdf2_salt)=
base64.b64decode(b64ed).rsplit('|', 2)
    # step 5
    user_pw=raw_input("User's password on server:")
    # step 6
    user_pw_hash=hashlib.sha256(user_pw+user_pw_salt).
digest( )
    user_pw_hash_pbkdf2=PBKDF2(user_pw_hash,
pbkdf2_salt).read(32)
    # step 7
    iv=ciphertxt[:AES.block_size]
    cipher=AES.new(user_pw_hash_pbkdf2,    AES.MOD-
E_CBC, iv)
    padded=cipher.decrypt(ciphertxt[AES.block_size:])
    unpadded=padded[:-ord(padded[len(padded)-1:])]
    print unpadded.decode('utf-8')
```

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A server-side computer-implemented method of exchanging certificate pinning information between a server and client over an unprotected network, comprising:
    obtaining a server certificate fingerprint to validate the server to the client during network communication;
    upon receipt of a request from the client, wrapping the server certificate fingerprint in an envelope that is encrypted using a hash of a password defined by the user and transmitted for storage on the server, wherein the password is stored on the server using the hash and a salt value of the password;
    transmitting the envelope as part of a payload over the network to the client to enable the client to decrypt the envelope using the password and obtain the server certificate fingerprint for pinning to data elements transmitted to the server creating a fingerprint confirmation packet by concatenating the server certificate fingerprint with a defined text string to form a concatenated string;
    encrypting the concatenated string with the password hash as a key to form an encrypted payload; and
    concatenating the encrypted payload with the password salt value to produce the payload.

2. The method of claim 1 wherein the payload is encoded as one of: a base64 code, uuencode, a matrix bar code, and an electronic message.

3. The method of claim 1 wherein the client is configured to decrypt the payload with the password hash value to obtain the concatenated certificate fingerprint to obtain the server certificate fingerprint.

4. The method of claim 3 wherein the client is further configured to check a value and position of the text string in the decrypted payload to verify a match with the defined text string forming the concatenated string.

5. The method of claim 4 further comprising, if the match is not verified, refusing the payload as invalid.

6. The method of claim 5 further comprising, if the match is verified, using the server certificate for pinning to the data elements transmitted to the server.

7. The method of claim 1 wherein the password is transmitted to the server using one of: an out-of-band transmission link, and an in-band transmission link.

8. The method of claim 7 wherein the in-band transmission link is one of: a controlled trusted link, and an untrusted link.

9. A client-server system exchanging a certificate key to validate a server to a client over an unprotected network, the system comprising:
   a server-side hardware processor defining a server certificate fingerprint to validate the server to the client during network communication and storing a user password defined on a storage device of the server using a hash and a salt value of the password, creating a fingerprint confirmation packet by concatenating the server certificate fingerprint with a text string to form a concatenated string, encrypting the concatenated string with the password hash as a key to form an encrypted payload, and concatenating the encrypted payload with the password salt value to produce the payload for transmission to the client by a server-side hardware interface component; and
   a client-side hardware interface component receiving, over a network link coupling the server and client, the payload and decrypting the encrypted payload in a client-side hardware processor using the password to obtain the server certificate fingerprint for pinning to data elements transmitted to the server over the network link.

10. The system of claim 9 wherein the network comprises a secure hypertext transport protocol (HTTPS) network.

11. The system of claim 9 wherein the password is transmitted to the server using one of: an out-of-band transmission link, and an in-band transmission link.

12. The system of claim 11 wherein the in-band transmission link is one of: a controlled trusted link, and an untrusted link.

13. The system of claim 9 wherein the payload is encoded as one of: a base64 code, uuencode, a matrix bar code, and an electronic message.

14. A computer program product, comprising a non-transitory computer-readable medium having a computer-readable program code embodied therein, the computer-readable program code adapted to be executed by one or more processors to exchange certificate pinning information between a server and client over an unprotected network, by executing instructions implementing a method comprising:
   obtaining a server certificate fingerprint to validate the server to the client during network communication;
   upon receipt of a request from the client, wrapping the server certificate fingerprint in an envelope that is encrypted using a hash of a password defined by the user and transmitted for storage on the server;
   transmitting the envelope as part of a payload over the network to the client to enable the client to decrypt the envelope using the password and obtain the server certificate fingerprint for pinning to data elements transmitted to the server;
   creating a fingerprint confirmation packet by concatenating the server certificate fingerprint with a defined text string to form a concatenated string;
   encrypting the concatenated string with the password hash as a key to form an encrypted payload; and
   concatenating the encrypted payload with the password salt value to produce the payload.

* * * * *